United States Patent
McDonald

(10) Patent No.: US 8,161,697 B1
(45) Date of Patent: Apr. 24, 2012

(54) STUDLESS LOAD BEARING PANEL WALL SYSTEM

(75) Inventor: William D McDonald, Santa Rosa, CA (US)

(73) Assignee: Bamcore LLC, Santa Rosa, CA (US)

( * ) Notice: Subject to any disclaimer, the term of this patent is extended or adjusted under 35 U.S.C. 154(b) by 117 days.

(21) Appl. No.: 12/147,444

(22) Filed: Jun. 26, 2008

Related U.S. Application Data

(60) Provisional application No. 60/946,705, filed on Jun. 27, 2007.

(51) Int. Cl.
*E04B 2/00* (2006.01)
*B32B 21/00* (2006.01)

(52) U.S. Cl. ..... 52/241; 52/745.09; 52/293.3; 52/481.1; 52/783.1; 52/586.1; 428/292.4; 428/106

(58) Field of Classification Search ............ 52/586.1, 52/586.2, 578, 293.3, 300, 782.1, 783.1, 52/796.1, 241, 481.1, 481.2, 745.09; 428/292.4, 428/323, 535, 106, 114
See application file for complete search history.

(56) References Cited

U.S. PATENT DOCUMENTS

| | | | | |
|---|---|---|---|---|
| 2,078,491 | A * | 4/1937 | Graham | 52/241 |
| 2,129,441 | A * | 9/1938 | Otto | 52/91.1 |
| 2,858,584 | A * | 11/1958 | Gaines | 52/586.1 |
| 3,276,797 | A * | 10/1966 | Humes, Jr. | 52/715 |
| 3,490,187 | A * | 1/1970 | Stauffer et al. | 52/481.1 |
| 3,859,768 | A * | 1/1975 | Donzis | 52/476 |
| 4,810,551 | A * | 3/1989 | Chu | 428/106 |
| 4,897,976 | A * | 2/1990 | Williams et al. | 52/281 |
| 4,951,436 | A * | 8/1990 | Burkstrand et al. | 52/241 |
| 5,014,476 | A * | 5/1991 | Leslie et al. | 52/220.2 |
| 5,353,562 | A * | 10/1994 | Decker | 52/309.7 |
| 5,976,644 | A * | 11/1999 | Sanaee et al. | 428/17 |
| 5,992,110 | A * | 11/1999 | Clear | 52/271 |
| 6,256,960 | B1 * | 7/2001 | Babcock et al. | 52/592.1 |
| 6,298,619 | B1 * | 10/2001 | Davie | 52/293.3 |
| 7,361,616 | B2 * | 4/2008 | Gold | 442/45 |
| 7,402,536 | B2 * | 7/2008 | Gold | 442/45 |
| 7,459,206 | B2 * | 12/2008 | Ou | 428/292.4 |
| 7,610,730 | B2 * | 11/2009 | O'Connor | 52/442 |
| 7,981,233 | B2 * | 7/2011 | Wellwood et al. | 156/182 |
| 2004/0065032 | A1 * | 4/2004 | Commins | 52/293.3 |
| 2006/0174577 | A1 * | 8/2006 | O'Neil | 52/586.2 |
| 2007/0267102 | A1 * | 11/2007 | Sullivan | 144/333 |
| 2009/0173429 | A1 * | 7/2009 | Shimamura | 156/91 |
| 2009/0263617 | A1 * | 10/2009 | Ou et al. | 428/106 |
| 2010/0178451 | A1 * | 7/2010 | Li | 428/106 |
| 2011/0293880 | A1 * | 12/2011 | Yu et al. | 428/106 |

\* cited by examiner

*Primary Examiner* — Robert Canfield
*Assistant Examiner* — Brent W Herring
(74) *Attorney, Agent, or Firm* — Gary Hoenig

(57) ABSTRACT

A studless load bearing panel wall system includes an assembly of bamboo based load bearing panels. The panels may be centrally milled along all edges suitable for accepting spline brackets along the vertical edges thereby constructing wall faces. Channels along the top and bottom edges accept two panels to form a studless wall having an inner and outer panel. The panels may be fastened to the splines and channels by means of screw fasteners. Bamboo based load bearing panels comprising layers formed from pressed bamboo strips bonded with layers of softwood veneers provide high load bearing strength while being dimensionally similar to conventional plywood. Non-load bearing alternate embodiments of the bamboo based panels in combination with similar spline brackets and channels are utilized to construct studless interior walls.

21 Claims, 7 Drawing Sheets

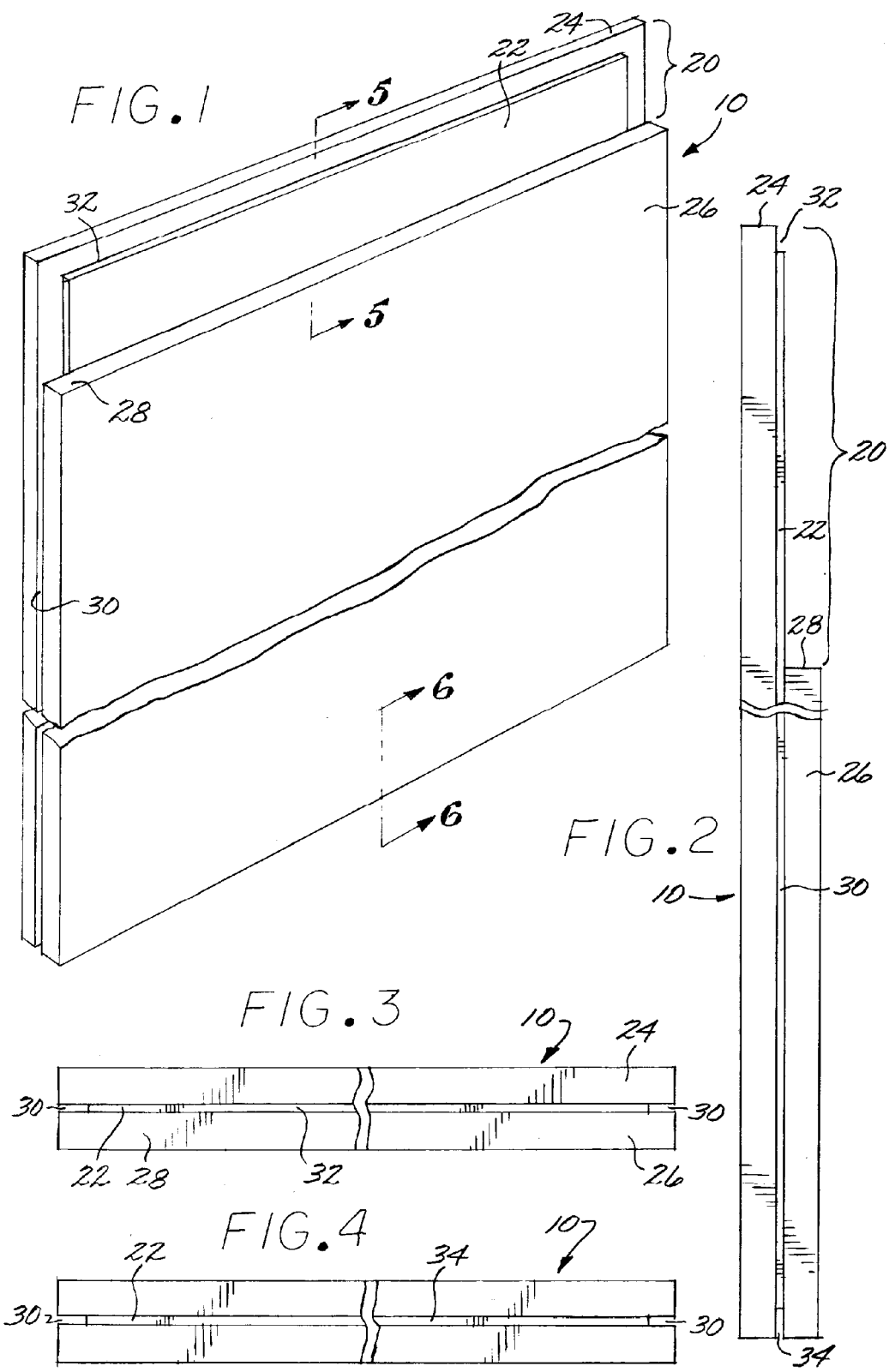

FIG. 5
FIG. 6
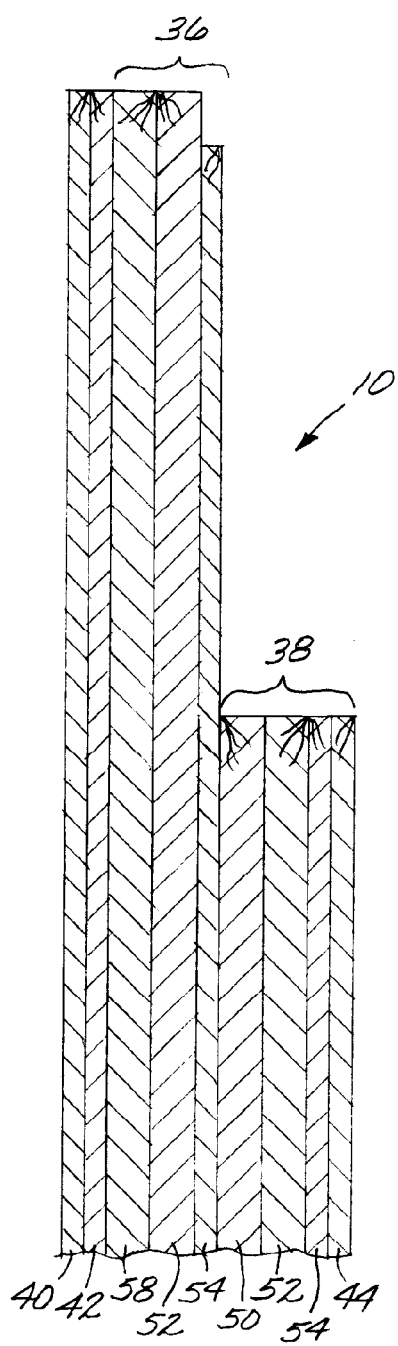
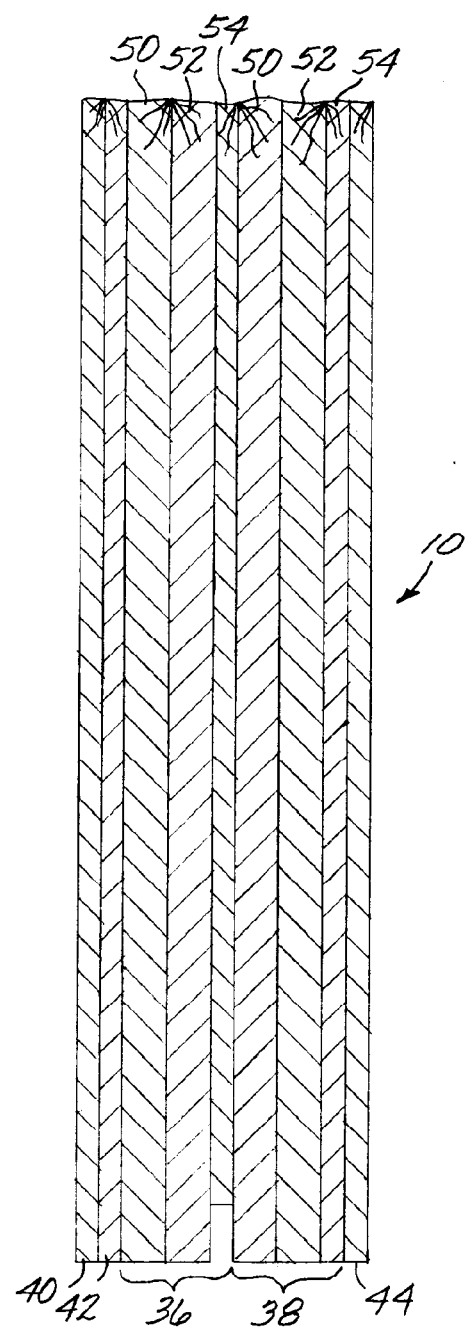

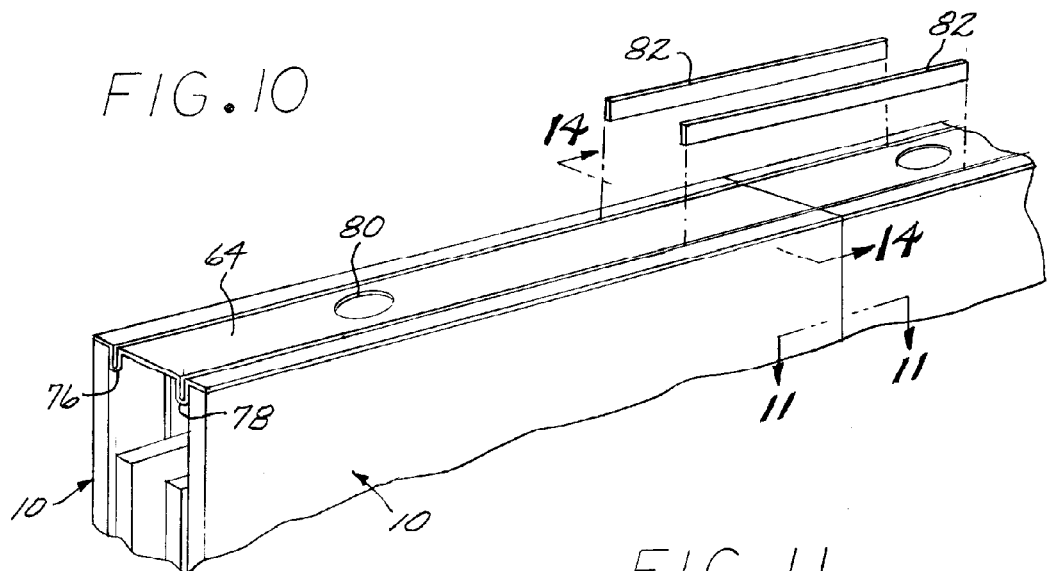
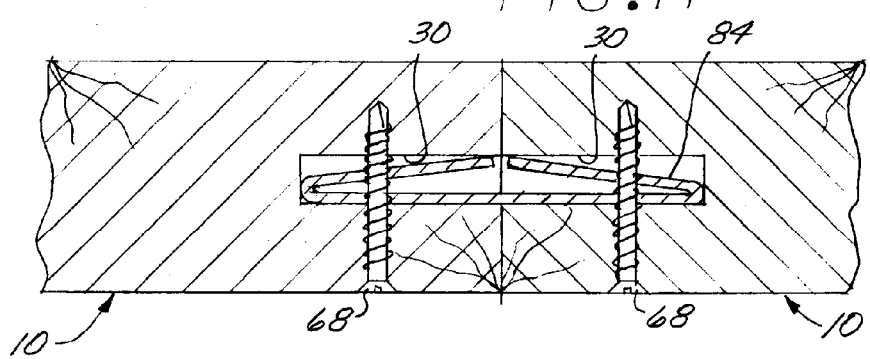
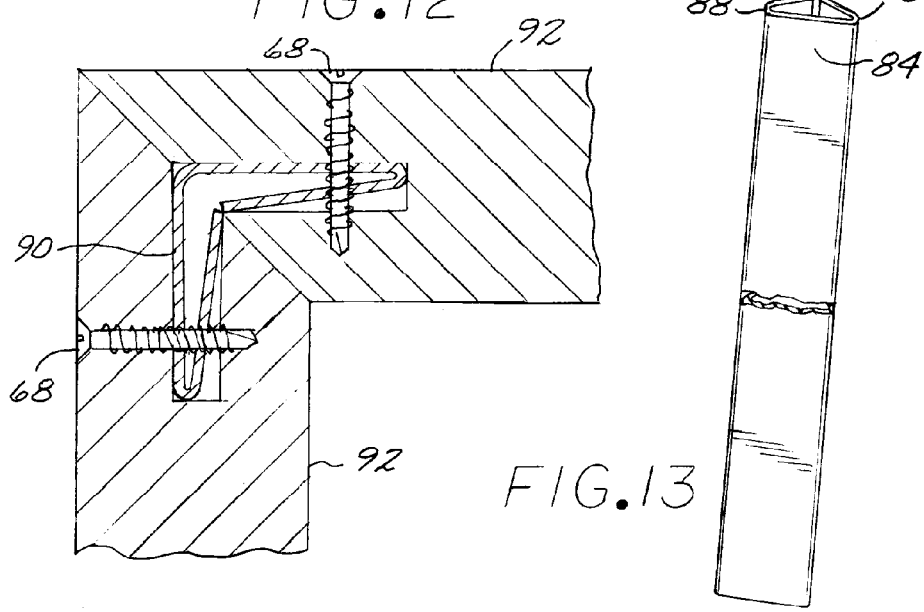

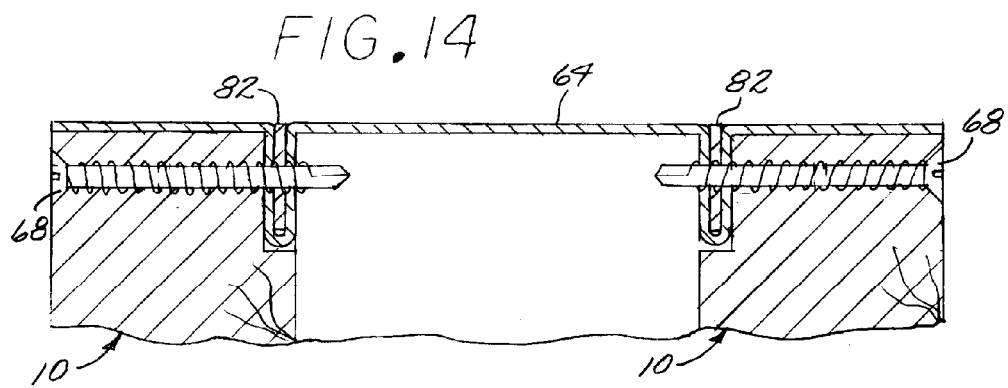
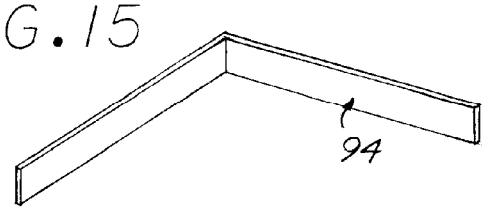
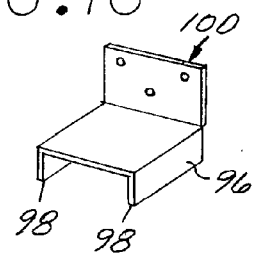
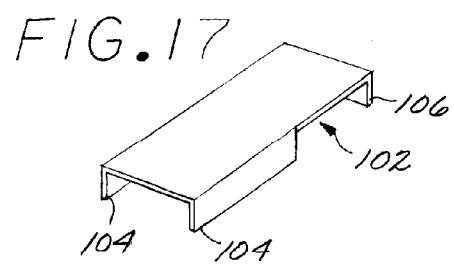
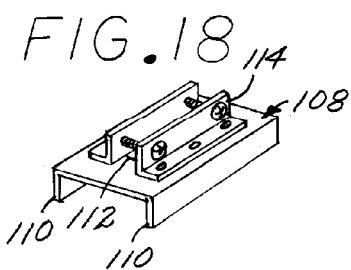
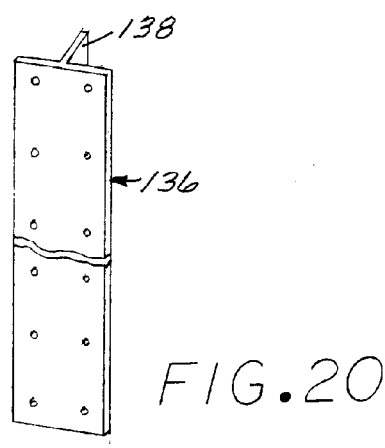
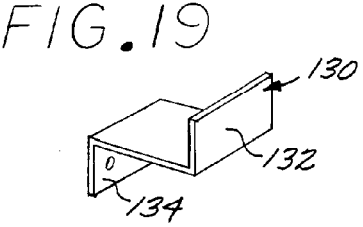

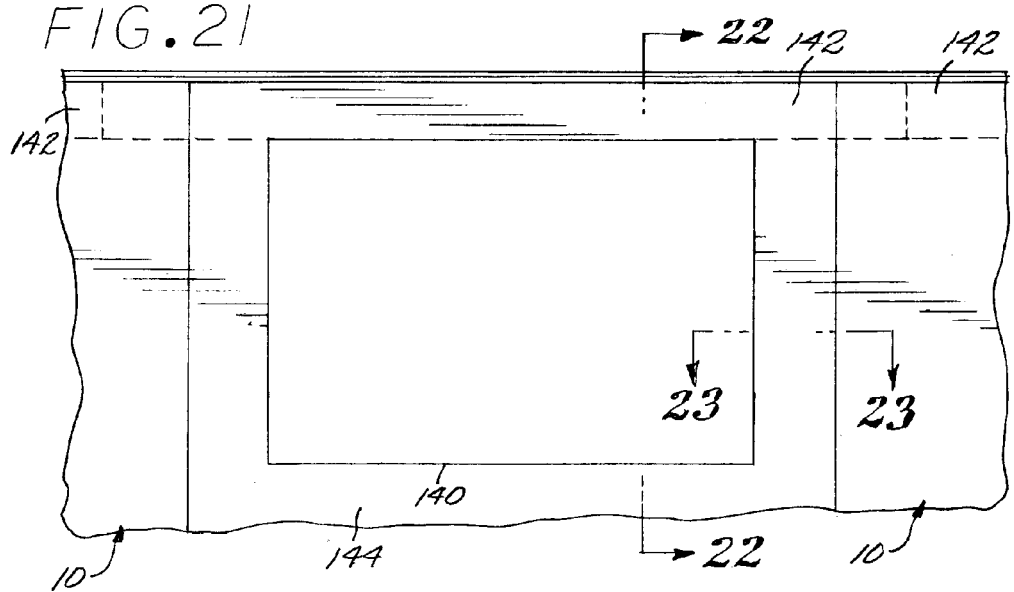
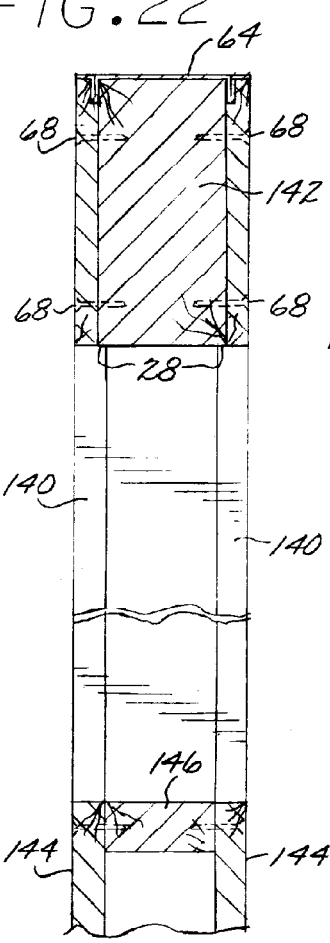
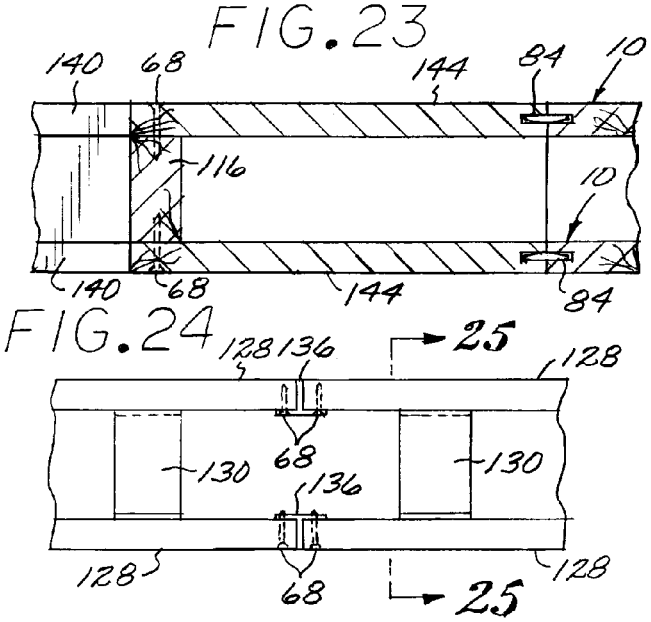
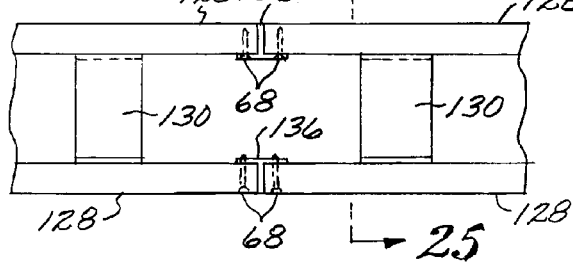
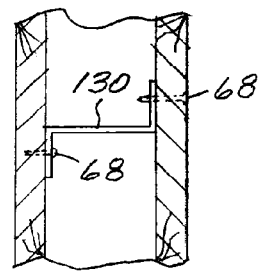

STUDLESS LOAD BEARING PANEL WALL SYSTEM

FIELD OF THE INVENTION

The invention relates to the construction industry and building materials; and, more particularly to a studless load bearing panel wall system incorporating bamboo based load bearing panels.

BACKGROUND OF THE INVENTION

Traditional western construction practices for wood based home building are typically directed towards assembling a frame, formed from studs, upon which sheeting is installed in the form of plywood for outside surfaces and drywall for inside wall surfaces. The frame is first constructed by carpenters in a piecemeal fashion wherein the various members are cut and fastened into position. With the frame in place, sheeting is applied to form the wall surfaces. The frame provides the structural strength of the structure as the vertical stud members assume the load of the constructed walls.

There are a number of disadvantages exhibited when using traditional western building techniques particularly in light of increasing material and labor costs. Stud material is typically harvested from a soft wood such as fir, which is also a principal component of the plywoods used. Although renewable, increasing demand for construction timber is increasing rapidly and outstripping the capacity for re-growth. Also, the typical western construction practices are labor intensive as a structure is constructed piecemeal on site, by a skilled crew necessitating both time and high labor cost. Further, there is considerable waste of raw materials as the building elements are fashioned to fit. Inconsistencies in the building practices of labor teams also introduce variability in quality. Increasing demands for energy efficient structures cast a less favorable light on frame built structures as the wall elements require additional insulation. Housing density increases demand higher sound insulation than typically provide by studded wall construction. More importantly, the use of quality wood, which is becoming increasingly scarce, presents increasing building costs. Therefore, what is needed is an improved building system which utilizes lower cost materials, reduced material quantity, efficient material use, low skill level for assembly, and short construction time.

Utilizing bamboo as a replacement for wood in load bearing construction materials has been problematic; however, bamboo has many advantages over wood as a raw material. Bamboo is generally lower cost than wood. Bamboo is fast growing requiring only 3 to 4 years before harvesting as timber grade bamboo, a growth time significantly less than wood. As compared to wood, bamboo has a higher rot resistance and resistance to insect infestation than most woods. Further bamboo has a higher level of carbon sequestration than most woods. Therefore, what is needed is an improved load bearing construction material and system principally utilizing bamboo while maintaining the bamboo culm structure largely in tact thereby capitalizing on the advantageous characteristics of bamboo timber while providing a material with substantially consistent and predictable dimensions and structural characteristics such as timber or other load bearing structural components.

SUMMARY OF THE INVENTION

Accordingly, the present invention is directed to a construction technique utilizing studless load bearing panels, and, more specifically, to a construction system utilizing bamboo based load bearing panels yielding structures having high load capacity, low material and manufacturing costs, high durability, and speedy assembly, thereby substantially obviating one or more of the problems due to the limitations and disadvantages of the related art.

The present invention is a studless load bearing wall system utilizing a combination of bamboo load bearing panels, splines, brackets and fasteners suitable for constructing the exterior walls and other load bearing walls of a building structure emulating the results of conventional western traditional frame and plywood or board construction. Bamboo based load bearing panels, having the appearance and structure similar to plywood, are constructed from at least two bamboo load bearing elements pressed and bonded together with layers of finishing softwood veneers to form a panel that is then centrally milled along a center line on all sides suitable for accepting brackets and splines fixed into place by self drilling screws to form wall elements. The basic bamboo panel element comprising a bamboo laminate layer having a first and second layer of a plurality of bamboo strips having a cortex and pith surface, parallel and longitudinally cut from bamboo culm pressed flat and planed wherein the first and second layers are each planed to a thickness, the cortex surface of the first layer of bamboo strip is bonded to the cortex surface of the second layer of bamboo strip and a wood veneer layer being bonded to the pith surface of the first layer of the bamboo strip positioned such that the grain of the wood veneer layer is perpendicular to the grain of the bamboo strip. Non-load bearing wall construction in this system utilize bamboo based panels manufactured from a single bamboo load bearing element with optional finishing softwood veneers wherein similar brackets and fasteners enable construction of interior non-load bearing walls. The non-load bearing bamboo panels being approximately half the thickness of the load bearing panels do not have a central milling to accept a bracket or spline, but instead are screwed directly onto a support bracket face.

The bamboo load bearing panel of the present invention is manufactured by cutting timber grade bamboo culm into lengths of bamboo cane, cutting the bamboo cane longitudinally and perpendicularly to the radius of the cane into at least two bamboo strips having longitudinal edges, an outer cortex surface and an inner pith ring surface, pressing the bamboo strips flat such that the longitudinal edges are substantially parallel, planning the bamboo cortex flat and sufficiently to provide adhesive keying, planning the pith ring surface of the bamboo flat with respect to the planed cortex surface removing material sufficient to yield a desired thickness of the bamboo strip, forming a bamboo laminate layer comprising a first layer of bamboo strips positioned contiguously along the longitudinal edges with the pith ring surface facing one direction and a second layer of bamboo strips positioned contiguously along the longitudinal edges with the pith ring surface facing one direction, the cortex surface of the first and second bamboo strip layers being in contact and such that the bamboo strip edges do not align with the bamboo strip longitudinal edges of the adjacent bamboo strip layer with the first and second bamboo strip layers being laminated; and, laminating at least one wood veneer to at least one pith ring surface of the bamboo laminate layer.

In an embodiment of the present invention, for load bearing applications, the basic bamboo panel element is, as described, a single bamboo laminate layer, comprised of the two bamboo strip strata, bonded to a single wood veneer layer; however, two basic bamboo panel elements are bonded directly together, oriented with matching grain direction, in combination with wood veneers applied to the outside surfaces to present a suitable wood finish and to obtain a desired overall dimensional thickness and structural strength of a finished bamboo load bearing panel.

The present invention further comprises a structural system wherein the bamboo load bearing panels, after being milled and prepared, are fastened together with various spline, bracket and channel elements as an assembly to form studless wall structures. The bamboo load bearing panels are arranged such that the grain of the bamboo laminate layer cores are positioned vertically so as to take advantage of the load bearing capability of the panel. Constructing a building becomes relatively simple by assembling pre-cut bamboo load bearing panels. The bamboo load bearing panel has top and bottom edge characterized by the ends of the vertical grain of the bamboo laminate layer core and left and right side edges running along the grain of the core. The top and bottom edges are centrally milled along the length of the edges to accept vertical protruding parallel ribs running the length of, and on a surface of, a bottom channel element being preferably constructed from sheet metal. Two bamboo load bearing panels are respectively positioned onto each rib and fastened with a self drilling screw inserted from a surface of the bamboo load bearing panel and perpendicularly into the vertical rib of the bottom channel. A similar top channel, also preferably constructed from sheet metal and having vertically protruding parallel ribs running the length of, and on a surface of, the top channel, is positioned with the ribs inserted into the centrally located millings of the top of the bamboo load bearing panel and similarly fastened with self drilling screws. The two bamboo load bearing panels fastened to a top and bottom channel element for the inner and outer portions of a studless wall assembly. Inter-panel spline brackets are used to fasten adjoining wall assemblies together thereby forming continuous wall sections. The spline bracket, being substantially flat and having an approximate length of the height of the bamboo load bearing panel is inserted into the centrally located milling on the left and right edges of the bamboo load bearing panel whereby the left side of one panel is abutted to the right side of an adjacent panel. Self drilling screws are again inserted into the surface of each panel near the left and right side edges and intersecting perpendicularly and through the spline to fasten the panels to each other.

The present invention further comprises various spline and bracket elements suitable for intraconnection of the panels to each other to form joints and structures required in building construction including corner splines, access panel splines and brackets, tee support brackets, Z support brackets, electrical cable support and routing brackets and the like.

It will be appreciated that the wall structures are formed by parallel positioned panels held at a distance by the top and bottom channel elements. The wall structures formed are therefore studless providing numerous advantages over conventional frame construction. It will further be appreciated that the assembly of pre-cut panels requires significantly less site-construction time thereby substantially reducing labor costs and assembly time. The bamboo load bearing panels are also lower in cost than the equivalent material cost required to support similar loads.

An objective of the present invention is to provide a system of constructing structures requiring lower costs than conventional building techniques. The present invention provides both lower material costs, lower labor costs in that skilled tradesmen are not mandatory for construction, and lower labor costs in that substantially less time is required to build a structure.

A further object of the present invention is to provide a system of construction that minimizes the raw material required through the use of a rapidly renewable resource such as bamboo. The use of bamboo, as a raw material, also provides numerous other advantages over conventional building materials in so much as bamboo is highly rot and insect resistant and possesses a high carbon dioxide sequestration capability thereby being environmentally friendly.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 1 is a perspective view of a bamboo based load bearing panel showing the header cut away of the top portion and the routed slot in each side according to the present invention.

FIG. 2 is a left side elevation view of the bamboo load bearing panel of FIG. 1 shown as one body for drawing and illustration purposes.

FIG. 3 is a top elevation view of the bamboo load bearing panel of FIG. 1.

FIG. 4 is a bottom elevation view of the bamboo load bearing panel of FIG. 1.

FIG. 5 is a side elevation view of the upper portion of the bamboo load bearing panel of FIG. 1 showing the composition and milling of the panel.

FIG. 6 is a side elevation view of the lower portion of the bamboo load bearing panel of FIG. 1 showing the composition and milling of the panel.

FIG. 10 is a perspective view of the top portion of two panels with the top channel element and channel spline about to be installed for securing the wall as a unit.

FIG. 11 is a cross section view taken on Line 11-11 of FIG. 10 showing the inter panel spline positioned in the routed slots of the bamboo load bearing panels being fastened with self drilling screws.

FIG. 12 is a cross section view of a corner joint with the inter panel corner splice in the routed slots of the bamboo load bearing panels and fastened with self drilling screws.

FIG. 13 is a perspective view of the inter panel spline.

FIG. 14 is a cross section view taken on Line 14-14 of FIG. 10 with the top channel element and spline strips installed in the slots in the plate and fastened with self drilling screws.

FIG. 15 is a perspective view an inter panel top channel plate spline for corner applications.

FIG. 16 is a perspective view of an inter panel wall truss spline channel.

FIG. 17 is a perspective view of a wall tee spline channel.

FIG. 18 is a perspective view of an electrical clamping device for electrical wire channel.

FIG. 19 is a perspective view of an inner wall Z brace.

FIG. 20 is a perspective view of a tee wall bracket.

FIG. 21 is a side elevation view of an assembled studless wall according to the present invention showing a cut out in the wall for a window, showing the header above the window cut out and extending into the header cut away openings of the adjacent panels.

FIG. 22 is a cross section view taken on Line 22-22 of FIG. 21 showing the header and fastening screws securing the header in place and blocking at the bottom of the window opening being screwed in place.

FIG. 23 is a cross section view taken on Line 23-23 of FIG. 21 showing the blocking installed along the side of the window opening cut out and fastened by screws.

FIG. 24 is a top elevation view of a studless wall according to the present invention being assembled with a tee bracket, also showing a Z bracket positioned between the bamboo load bearing panels maintaining the panel spacing.

FIG. 25 is a cross section view taken on Line 25-25 of FIG. 21 showing the Z bracket fastened to the bamboo load bearing panels to maintain spacing.

DETAILED DESCRIPTION OF THE PREFERRED EMBODIMENT

Figure 7:
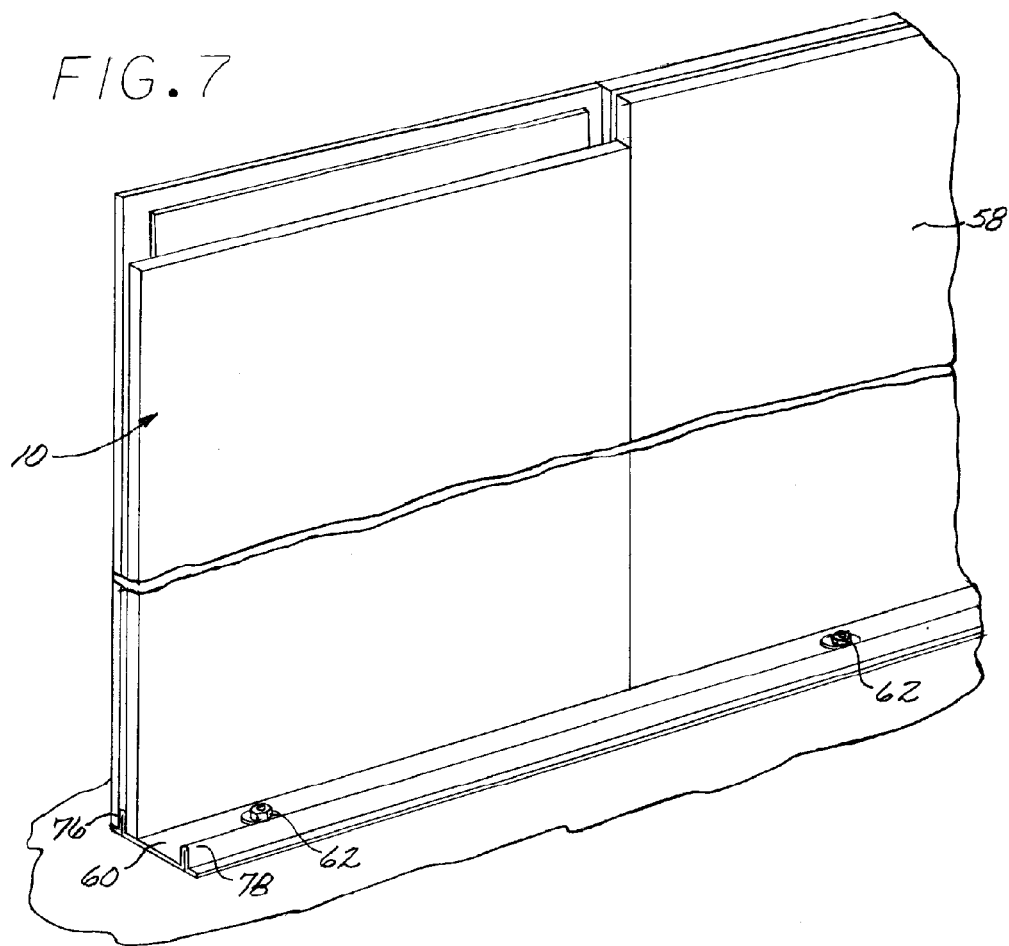
FIG. 7 is a perspective view of a first bamboo load bearing panel with a header cut away and a second bamboo load bearing panel absent a header cut away set up to form a wall with the anchor bottom channel element bolted to the concrete footing or slab for a building.

Although particular embodiments of the invention have been described in detail for purposes of illustration, various modifications may be made without departing from the spirit and scope of the invention. Where examples are presented to illustrate aspects of the invention, these should not be taken as limiting the invention in any respect.

Now referring in greater detail to the various figures of the drawings wherein like reference characters refer to like parts, there is shown in FIG. 1, the preferred embodiment of the present invention, a bamboo load bearing panel comprising two bamboo load bearing elements and three softwood veneer finishing layers. The bamboo load bearing panel is centrally milled along all edges to a depth of approximately one to two inches with the resulting milled groove having a width of approximately 3/16 inch cutting into a central softwood veneer 22. The precut panel 10 therefore has side milled grooves 30 running vertically along the left and right side edges of the panel. The panel 10 also has a top milled groove 32 along the top edge of the panel 10 and a bottom milled groove 34 along the bottom edge of the panel. The resulting precut panel 10, therefore presents an outer load bearing portion 24 and an inner load bearing portion 26 capable of sustaining vertical compression load when the panel is positioned so as to stand on the bottom edge with grain of the bamboo laminate layers running vertically thereby sustaining compression load from the top end of the panel. In FIG. 1, the inner load bearing portion 26 is optionally cut away at 20 to provide a header support ledge 28. The top section of the inner load bearing portion 26 is cut to accommodate one side of header element positioned between two respectively opposing and identically cut bamboo load bearing panels 10.

In FIG. 2, a side edge view of the panel 10 shows the outer load bearing portion 24, the central softwood veneer 22, the top milled groove 32, the bottom milled groove 34, a left side edge milled groove 30, and an optional header cut away 20 with the resulting header support ledge 28. Similarly, FIG. 3 showing the top edge of the panel 10 illustrates the top centrally milled groove 32 and the side grooves 30. FIG. 4 shows the bottom of the panel 10 also with a bottom milled groove 34 and the side groove 30.

A feature of some embodiments of the invention is the load bearing capability of the panel 10. Therefore, the construction of the panel 10 is important. Referring now to FIGS. 5 and 6 showing a cross section of the top and bottom portion of the bamboo load bearing panel 10 with an optional header element cut away, the composite layers of the panel 10 are visible. In the preferred embodiment, an embodiment of the bamboo load bearing panel is configured to form a panel comprising two basic bamboo load bearing elements 36, 38 bonded to each other, each further comprising a bamboo laminate layer fabricated from pressed and flattened bamboo strips cut vertically from bamboo culm, prepared and bonded with their outer cortex layers positioned so as to touch each other with the central pith portion of the bamboo culm outwardly facing, and a softwood veneer bonded, with the grain positioned horizontally, to one of the outwardly facing pith faces; and a first 40, second 42 and third 44 finishing softwood veneer bonded to the outside surfaces of the two basic bamboo load bearing elements 36, 38. The basic bamboo load bearing elements 36 and 38 therefore each comprise a first 50 and second 52 layer of bamboo and a softwood veneer 54. The resulting bamboo load bearing panel 10 comprises a first finishing softwood veneer 40 with the grain positioned vertically bonded to a second finishing softwood veneer 42 with the grain positioned horizontally, the second softwood veneer 42 bonded to the pith surface of a first basic bamboo load bearing element 36 with the grain of the bamboo positioned vertically, the first basic bamboo load bearing element 36, having a softwood veneer surface from one of the softwood veneers 54 with the grain positioned horizontally, being bonded to the pith surface of a second bamboo load bearing element 38 with the grain of the bamboo positioned vertically, and the softwood veneer surface from another of the softwood veneers 54 of the second bamboo load bearing element 38 is bonded to a third softwood veneer 44 with the grain running vertically. Traditional manufacturing techniques for bonding plywood may be used to bond and produce the bamboo load bearing panel 10. The choice of softwood veneers on the front and back surfaces of the panel are selected commensurate with the particular application requirements so as to provide a pre-selected surface finish. The thickness of the panel is dependent upon the number of basic bamboo load bearing elements utilized as required to support a desired load.

The bamboo laminate cores (i.e., the first 50 and second 52 layers of bamboo) provide the bulk of the vertical compression strength by forming the laminate layers from flattened bamboo cane formed into strips that have a length equal to the height of the panel 10 thereby providing a continuous member of bamboo. This construction capitalizes upon the naturally occurring strength characteristics of bamboo and maximizes utilization of the resource. U.S. patent application Ser. No. 12/113,943, which is herein incorporated by reference, describes in further detail exemplary bamboo panel elements suitable for use as the bamboo load bearing elements 36 and 38.

It will be appreciated that other types of load bearing panels and alternate layer configurations of the bamboo load bearing panels exhibiting specific load bearing characteristics may be used in the alternate of preferred embodiment of the bamboo load bearing panel of the present invention. Similarly, the load bearing panels may optionally be positioned such that the load bearing grain is horizontal thereby being perpendicular to a vertically applied load as may be required for particular applications. For some embodiments, one or more of the first, second and third finishing softwood veneers 40, 42 and 44 may be omitted. For example, the panel 10 may be oriented such that the softwood veneer 54 of the second bamboo load bearing element 38 may provide the pre-selected surface finish for the front surface with the back surface of the panel 10 that is not visible when assembled being the first layer 50 of bamboo forming part of the first basic bamboo load bearing element 36.

Figure 8:
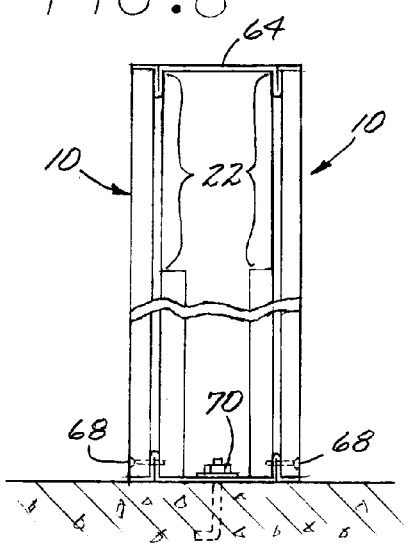
FIG. 8 is a side elevation view showing the outside and inside bamboo load bearing panels fastened to the anchor bottom channel element and the top channel plate in position thereby forming a complete wall, the top plate being fastened in place, the bottom of the panels fastened to the anchor bottom channel element with self drilling fasteners, the channel being fasted to the footings or slab with anchor bolts.

Referring next to FIG. 7, a studless wall is constructed in wall sections using a plurality of pre-cut bamboo load bearing panels by positioning a panel 10 with optional header cut away and with the bottom milled groove accepting a first vertical rib 76 of a bottom channel element 60. The channel 60 has been positioned in pre-selected locations where walls are desired and fastened to a supporting foundation with tie fasteners 62 being a lag bolt. Shown here is also a pre-cut bamboo load bearing panel 58 without a header cut away positioned adjacent to panel 10. Together the panels form part of the outer portion of a wall section. The inner portion of a studless wall section is completed, as in FIG. 8, by positioning another panel with the bottom milled groove accepting a second vertical rib 78 of the bottom channel element 60. Note that the optional header cut-aways 22 of the respective panels oppose each other. A top channel element 64, identical in construction to the bottom channel element 60 with two vertical ribs running the length of the channel element and protruding perpendicularly from the base of the channel element and parallel to each other, is positioned along the top edges of the panels 10 and is received by the milled grooves of the panels. Both the top 64 and bottom 60 channel elements are fastened to the respective channels by inserting self drilling fasteners 68 through the surface of the panel 10 and into and through the rib of the channel element. It will be appreciated that the distance between the ribs of the channel elements fixes the cavity width of the assembled studless wall section. The tie down fastener 70 is an alternative tie down means used when the studless wall section is constructed on a concrete foundation.

Figure 9:
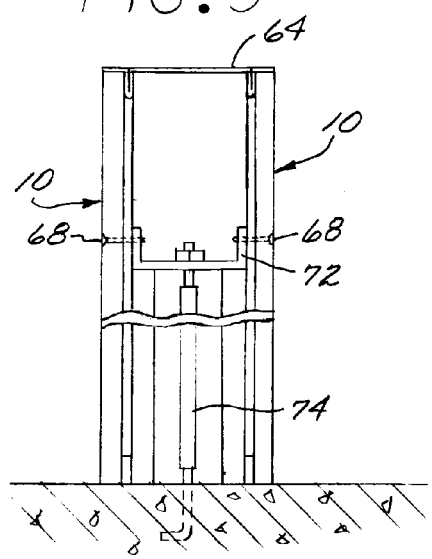
FIG. 9 is a side elevation view similar to FIG. 8 showing an alternate anchoring of the wall to the footings or slab.

FIG. 9 shows a further alternate embodiment of a tie down method, for concrete foundations, with a tie down plate 72 resting on the header support ledge 28 of the panels 10 and fixed to the panels with fasteners 68. In this embodiment, the tie down includes a threaded elongate rod 74 inserted through a hole in the plate 72 and fastened to the rod with a nut.

The top channel element 64 may optionally include access holes 80, as shown in FIG. 10, for purposes of blowing insulation material into the cavity of the wall. The metal splines and other fitting brackets are constructed from flat sheet metal. Consequently, the ribs 76, 78 of the channel elements 64 form an opening on the opposing surface of the channel. Channel splines 82, being substantially flat strips of metal, are insertable in the back of the vertical ribs 76, 78. The channel splines 82 provide support between adjacent channel sections and joint areas between panels. These channel splines 82 are inserted into the channel openings before the self drilling fasteners 68 are inserted.

FIG. 11, being a view taken along Line 11-11 of FIG. 10, shows an inter panel spline 84 positioned in the milled grooves 30 along the left and right side edges of adjacent panels 10 fastened by self drilling fasteners 68. This spline 84 is used to secure the vertical sides of adjacent panels. Wall sections are fitted together with the inter panel splines 84 thereby forming continuous studless load bearing panel walls. The spline 84, as shown in FIG. 13, is constructed from a strip of sheet metal having a width approximately twice to four times the depth of the milled groove 30 and a length substantially the same as the height of the panel 10 such that it runs continuously along the edge of the panel. The longitudinal edges of the strip are folded back at 86 and 88 such that the finished width of the spline 84 is approximate twice the depth of the milled groove 30. The folded edge provides a wedge that is pressed into the milled groove 30 thereby holding the spline 84 in place thus aiding assembly.

Similarly inter panel corner splines 90 as shown installed in FIG. 12 between two panels 92 with mitered corner edges and fastened with self drilling fasteners 68 is formed by further folding the inter panel spline 84 along the center line thereby forming a corner support.

It should be noted that the top channel element 64 when positioned along the top edge of two opposing panels forming the studless wall do not require screwing through the channel into the top edge of the panels 10. FIG. 14, being a cross section view of the top portion of a wall section, shows the correct installation of the top channel element 64 with the channel splines 82 in place and fastened with the self drilling fasteners 68. The void created by the opposing header cut aways optionally accommodates a header element into which the self drilling fasteners 68 reach thereby securing a header element to the wall section.

The bamboo load bearing panels of the wall sections may be fitted one to another in any fashion required to construct a pre-selected structure. Consequently, a variety of alternate splines and brackets may be required. For example, in FIG. 15, a corner channel spline 94 is illustrated. The corner channel spline 94 is inserted into the top channel element where the channel element is mitered to match a wall corner as in FIG. 12.

FIG. 16 illustrates an important inter panel wall truss splice 96 formed from sheet metal used for fastening a wall to a truss by inserting downwardly facing tabs 98 into the top channel element 64 openings, and an upwardly facing tab 100 vertically and perpendicularly positioned with respect to the wall suitable for fastening to an adjacently positioned truss.

Still further in FIG. 17, a wall tee splice 102 has downwardly facing spline tabs 104 suitable for inserting in the openings of a top channel element 64 of a wall which is abutted perpendicularly to a second wall. The splice has a further downwardly facing spline tab 106 perpendicularly positioned to insert into a top channel opening of the second wall.

Access for electrical cables into the wall cavity from the top of an assembled wall section is provided by using the electrical clamping device 108, as shown in FIG. 18, being a sheet metal plate having two downwardly facing spline tabs 110 suitable to fit the openings in the top channel elements 64, and access hole 112 centrally located in the place with a clamp 114 to hold a cable in place when positioned in the access hole.

Figure 26:
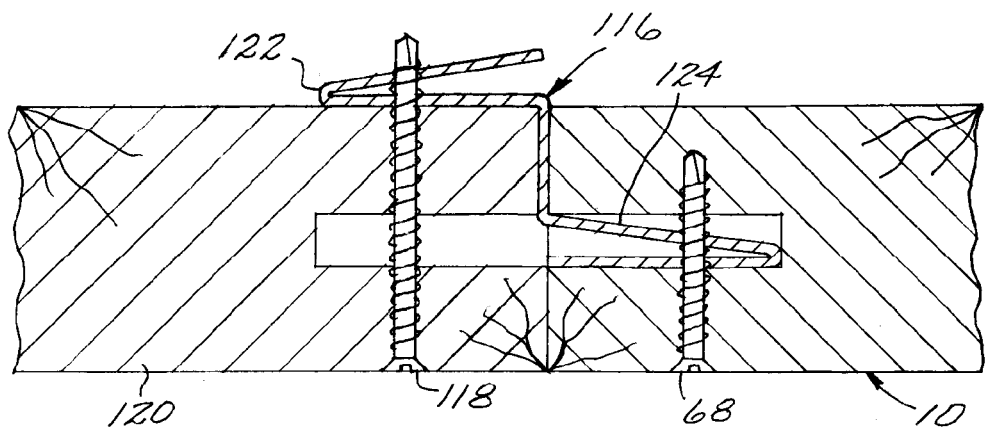
FIG. 26 is a cross section view similar to FIG. 11 showing an access panel spline fastened with self drilling screws to the center milled cut of one panel and the rear of an adjacent panel.
Figure 27:
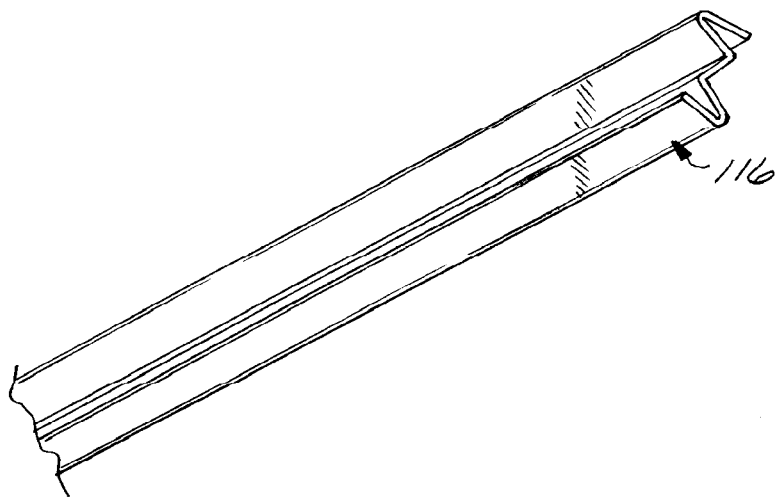
FIG. 27 is a perspective view of an access panel spline.

Referring briefly to FIGS. 26 and 27, for applications wherein access to the wall cavity may be required after construction, an access panel spline 116 is used to provide easy removal and replacement of a wall section. In FIG. 26, showing the access panel wall spline 116 in position, the panel to be removed, shown at 120 rests on a folded rear tab 122 of the spline with the folded front tab 124 inserted into the milled groove 30 of the adjacent panel 10. Long self drilling fasteners 118 are inserted through the access panel 120 and into the folded rear tab 122 of the spline 116. FIG. 27 shows a perspective view of the access panel spline 116 also formed from folded sheet metal.

The interior walls of a structure need not necessarily require high load bearing panels and consequently bamboo load bearing panels having a single basic bamboo load bearing element instead of two basic bamboo load bearing elements may be used. In this embodiment, the panels do not provide a thickness sufficient for milling a groove along the edges. Consequently, the panels are positioned against the sides of the ribs 76, 78 of the top and bottom channel elements 64 and secured with fasteners to the ribs. Differing brackets are therefore required to accommodate the thinner panels.

In FIG. 19, an interior wall Z brace 130 is illustrated which is placed in the wall cavity with the forward tab 132 fixed to one panel and the rear tab 134 is fixed to the rear panel. The Z brace 130 maintains the spacing of the wall cavity in absence of the edge milled grooves of the load bearing panels. FIG. 24, a top view of wall section, shows the Z braces 130 in position between the wall constructed of bamboo non-load bearing panels 128 forming an interior wall. FIG. 25, a cross section view taken along Line 25-25 of FIG. 24, again illustrates the Z brace 130 in place in a wall cavity and secured with self drilling fasteners 68.

Similarly, an interior wall tee bracket 136, in FIG. 20 is used to join two adjacent panels without the edge milled groove. An inter panel spline used with the load bearing panels is not suitable because of the missing milled groove. The tee tab 138 is inserted between the panel edges and, as shown in FIG. 24, the bracket is secured to the panels with self drilling fasteners. Note that the tee bracket 136 is installed with the base on the inside of the wall in the cavity with the tab 138 facing towards the outside surfaces of the wall. The fasteners may be inserted from either side of the panel face.

In order to satisfy specific code requirements specific construction features must be present in a structure regardless if they are necessary to maintain the structural integrity of the bamboo load bearing panel construction system of the present invention. FIGS. 21, 22 and 23 show various views of a typical window installation including required code features in a studless wall constructed according to the invention. Bamboo load bearing panels 142 with window cut out at 140 are assembled into a wall section with adjacent bamboo load bearing panels 10 with inter panel splines 84 visible in FIG. 23. A header element is installed in the wall cavity formed between the panels, resting on the header support ledge 28 and is seated between the ribs of the top channel element visible in FIG. 22. The header element 142 is fastened securely by fasteners 68. A window support member 146 formed from standard lumber is fashioned to fit in the wall cavity and around the edges of the window cut out thereby providing support for a window assembly. The bamboo load bearing panels may not need the header element according to structural integrity analyses, however, building code restrictions may require its present.

I claim the following:

1. A load bearing panel wall system, comprising:
a first panel having top and bottom edges and comprising a first bamboo laminate layer having outer surfaces and a first layer of bamboo strips, each having pith and cortex surfaces, oriented parallel next to one another to have grain direction alike and opposite a second layer of bamboo strips such that an internal interface between the first and second layers is formed by bonded together corresponding cortex surfaces of the bamboo strips in the first and second layers outer surfaces of the bamboo laminate defined by pith surfaces of bamboo strips respectively in the first and second layers,
a second panel; and
a connecting element coupled to the first panel and the second panel, wherein the connecting element fixes the first panel parallel to the second panel such as to define a hollow and frameless cavity disposed between the first and second panels.

2. The load bearing panel wall system of claim 1, wherein the second panel comprises a second bamboo laminate layer with bamboo strips within the second bamboo laminate layer oriented parallel next to one another to have grain direction alike.

3. The load bearing panel wall system of claim 1, wherein the first panel comprises a wood veneer disposed between the first bamboo laminate layer and a second bamboo laminate layer.

4. The load bearing panel wall system of claim 1, wherein a wood veneer of the first panel disposed between the first bamboo laminate layer and a second bamboo laminate layer of the first panel has a smaller dimension than the first and second bamboo laminate layers to define a groove in an edge of the first panel.

5. The load bearing panel wall system of claim 1, wherein a groove in an edge of the first panel mates with a rib of the connecting element.

6. The load bearing panel wall system of claim 1, wherein an inner composite layer of the first panel disposed between the first bamboo laminate layer and the second panel is smaller than the first bamboo laminate layer.

7. The load bearing panel wall system of claim 1, wherein the first and second panels are secured to a supporting foundation via a tie down plate resting on an inner composite layer that forms part of the first panel, is smaller than the first bamboo laminate layer and is disposed between the first bamboo laminate layer and the second panel.

8. The load bearing panel wall system of claim 1, wherein the connecting element includes top and bottom channel elements that mate with respective grooves in top and bottom edges of the first panel.

9. The load bearing panel wall system of claim 1, wherein the connecting element includes top and bottom channel elements that mate with respective grooves in top and bottom edges of the first panel, and an inter panel spline mates with respective groves in a side edge of the first panel and in a side edge of a laterally adjacent panel.

10. The load bearing panel wall system of claim 1, wherein the second panel comprises a second bamboo laminate layer with bamboo strips within the second bamboo laminate layer oriented parallel next to one another to have grain direction in common with bamboo strips within the first bamboo laminate layer.

11. The load bearing panel wall system of claim 1, wherein the first panel comprises first and second wood veneers coupled to a first face of the first bamboo laminate layer, a third wood veneer coupled to a second face of the first bamboo laminate layer, and a second bamboo laminate layer disposed between the third wood veneer and fourth and fifth wood veneers.

12. A method of assembling a load bearing panel wall system, comprising:
providing a first panel comprising a first bamboo laminate layer and a second panel, wherein the bamboo laminate layer includes a first layer of bamboo strips oriented parallel next to one another to have grain direction alike and opposite a second layer of the bamboo strips such that an internal interface between the first and second layers is formed by bonded together corresponding cortex surfaces of the bamboo strips in the first and second layers; and
fastening a connecting element to the first and second panel, wherein the connecting element fixes the first panel parallel to the second panel with a hollow wall cavity disposed between the first and second panels.

13. The method of claim 12, wherein the second panel comprises a second bamboo laminate layer with bamboo strips within the second bamboo laminate layer oriented parallel next to one another to have grain direction alike.

14. The method of claim 12, securing the panels to a supporting foundation with the first panel oriented to align the grain direction with a loading force on the first panel.

15. A studless load bearing panel wall system, comprising:
a plurality of wall sections, wherein each wall section comprises:
first and second bamboo load bearing panels each having top, bottom and side edges and each comprising a first bamboo laminate layer wherein the first bamboo laminate layer includes a first layer of bamboo strips oriented alike and opposite a second layer of the bamboo strips such that an internal interface between the first and second layers is formed by bonded together corresponding cortex surfaces of the bamboo strips in the first and second bamboo strip layers;
top and bottom channel elements disposed against the first and second bamboo load bearing panels adjacent respectively the top and bottom edges of the first and second bamboo load bearing panels, the channel elements and bamboo load bearing panels together defining a hollow wall cavity; and
first fasteners securing the channel elements to the panels, wherein each first fastener is inserted through one of the panels and one of the channel elements.

16. The studless load bearing panel wall system of claim 15, further comprising spline brackets inserted into a longitudinally arranged groove in each side edge of the panels so as to couple laterally adjacent panels with adjacently positioned panels of the wall sections, the spline brackets being secured by a plurality of second fasteners, each second fastener being inserted through one of the panels and into the groove securing the spline bracket and into the spline bracket thereby securing the spline bracket to the panel.

17. The studless load bearing panel wall system of claim 15, further comprising recesses along all the edges of the panels, wherein first and second parallel protruding ribs of the top channel element are received by the recesses at the top edge of respectively the first and second bamboo load bearing panels and first and second parallel protruding ribs of the bottom channel element are received by the recesses at the bottom edge of respectively the first and second bamboo load bearing panels.

18. The studless load bearing panel wall system of claim 15, further comprising grooves milled centrally along all the edges.

19. The studless load bearing panel wall system of claim 15, wherein the top and bottom channel elements are each constructed of sheet metal having two longitudinally extending and parallel ribs protruding from one side thereof.

20. The studless load bearing panel wall system of claim 15, wherein the wall sections are anchored to a foundation using a threaded bolt and nut secured to the wall sections at a location between the first and second panels and through the bottom channel element and into the foundation.

21. The studless load bearing panel wall system of claim 20, wherein the location between the first and second panels is flush with the top surface of the bottom channel element.

* * * * *